United States Patent [19]
Krul et al.

[11] Patent Number: 5,716,423
[45] Date of Patent: Feb. 10, 1998

[54] MULTI-STAGE DEOILER WITH POROUS MEDIA

[75] Inventors: Allan D. Krul, Jupiter, Fla.; Rodney L. Giersdorf, Port St. Lucie, Fla.

[73] Assignee: United Technologies Corporation, Hartford, Conn.

[21] Appl. No.: 576,664

[22] Filed: Dec. 21, 1995

[51] Int. Cl.⁶ .................................................. B01D 45/14
[52] U.S. Cl. ............................................ 55/485; 55/487
[58] Field of Search ........................... 55/323, 345, 437, 55/485, 487; 60/39.08, 39.02

[56] References Cited

U.S. PATENT DOCUMENTS

| | | | |
|---|---|---|---|
| 3,085,381 | 4/1963 | Soleck | 55/323 |
| 4,203,739 | 5/1980 | Erdmannsdorfer | 55/323 |
| 4,511,016 | 4/1985 | Doell | 184/6.11 |
| 4,531,358 | 7/1985 | Smith | 60/39.08 |
| 4,714,139 | 12/1987 | Lorenz et al. | 184/6.11 |
| 4,759,845 | 7/1988 | Selesnick | 55/485 |
| 4,877,527 | 10/1989 | Brownell | 55/487 |
| 5,114,496 | 5/1992 | Giersdorf et al. | 55/345 |
| 5,121,599 | 6/1992 | Snyder et al. | 60/39.02 |

*Primary Examiner*—Jay H. Woo
*Assistant Examiner*—Ivrie Schwartz
*Attorney, Agent, or Firm*—Norman Friedland

[57] ABSTRACT

An inducer with reduced number of blades and varying density porous media disks are arranged in a deoiler mounted on a rotating shaft for total free separation of the oil from and air/oil mixture. The porous media disks are arranged with the lower density grade coming into contact with the air/oil mixture and proceeds toward the higher density grade. The arrangement of the stages of separation, the specially designed oil discharge holes and the flow geometry maximizes oil separation and removal and reduces pressure losses to control the pressure drop of the deoiler.

16 Claims, 2 Drawing Sheets

MULTI-STAGE DEOILER WITH POROUS MEDIA

This invention was made under a United States Government contract and the Government has rights herein.

CROSS REFERENCES

The subject matter of this invention relates to the invention described in the contemporaneously filed U.S. patent application Ser. No. 08/576,735 entitled "DEOILER SHAFT VORTEX SEPARATOR" (Attorney Docket No. F-7629) filed by Allan D. Krul and J. WESLEY HARRIS, JR. and commonly assigned to United Technologies Corporation.

TECHNICAL FIELD

This invention relates to deoilers and particularly to deoilers for gas turbine engines employing a rotatable inducer and porous media.

BACKGROUND ART

This invention constitutes an improvement over the structure and system described and claimed in U.S. Pat. No. 5,114,446 granted to Giersdorf et al on May 19, 1992 entitled "Deoiler for Jet Engine" wherein both coinventors of the present patent application and the assignment to United Technologies Corporation are in common. As taught in the U.S. Pat. No. 5,114,446, supra, the deoiler serves to separate the oil from the oil/air mixture that flows from the bearing compartments and gear boxes of the gas turbine engine. The separated oil is then returned to the system and the residue air is dumped overboard. Obviously, dumping air into the environment must be done cautiously so as not to contaminate the ambient air with oil which may otherwise occur if the oil isn't satisfactory separated. And the oil is returned to the lubricating system for lubricating and cooling the rotating parts or the total oil in the lubrication system would otherwise become depleted. While the deoiler disclosed in the U.S. Pat. No. 5,114,446, supra, is satisfactory for certain engines, it may not be satisfactory for others. For example the pressure drop through the deoiler system may be too large for avoiding the back pressure that cannot be withstood by the bearing compartment. Or the deoiler system doesn't remove sufficient amounts of oil entrained in the air that is dumped overboard. The purpose of this invention is to assure that the oil is completely removed from the air before being discharged into ambient and that substantially all of the oil is returned to the lubrication system.

As is described in the U.S. Pat. No. 5,114,446, supra, which is incorporated herein by reference, the deoiler structure provides for dynamically separating the air/oil mixture in a high speed rotating bladed rotor that includes a plurality of specifically designed features that uniquely and effectively separate the oil from the mixture and maintains a minimal back pressure. Of these features include the axial flow entry, cambered inducer, exterior vanes, laid over internal vanes and discrete window geometry; all in the absence of welds. It will be noted that for this inducer to be effective it must contain a plurality of blades, say 8–12.

As noted above, this prior art deoiler is efficacious for certain engines, but has proven to be less than totally effective in others. This invention is intended to begin where the prior art deoiler leaves off. In accordance with this invention, wire mesh coalescers or porous media disks of varying densities are utilized together with the inducer and are judiciously incorporated into the system which not only has the propensity of removing substantially all the oil in an improved pressure scenario, it also allows the number of blades on the rotor to be reduced. In addition the invention provides a variable length housing to accept a varying number of disks which may be of different densities in order to coalesce smaller oil droplets and change the pressure drop. The invention also contemplates discrete oil discharge holes for manifesting efficient oil removal of the separated oil and a unique flow path geometry.

SUMMARY OF THE INVENTION

An object of this invention is to provide an improved deoiler system.

Another object of this invention is to provide an improved deoiler system for the lubrication system of a gas turbine engine which is characterized as having a lower back pressure and more effective oil removal than heretofore known systems.

A feature of this invention is the utilization of variable density oil coalescers formed in the shape of disks or wafers mounted in a housing downstream of the rotating bladed inducer. The housing for supporting the disks may be variable in length so as to accommodate different size and number of disks.

Another feature of this invention is the reduced number of blades in the bladed rotor that reduces the complexity, weight and size of the rotor without adversely affecting the oil removal aspects of the system.

Another feature of this invention is the universality of the system that allows for a multi-stage particle separation and varying pressure drop capability to be capable of use in a number of different engine design configurations and conditions.

Another feature of this invention is the judicious location and geometry of the flow path and the discrete oil discharge holes for optimum oil removal.

The foregoing and other features of the present invention will become more apparent from the following description and accompanying drawings.

DETAILED DESCRIPTION OF THE PREFERRED EMBODIMENT

While this invention is disclosed in its preferred embodiment for separating the oil from an oil/air mixture in a lubrication system for a gas turbine engine, as one skilled in this art will appreciate this invention can be utilized for separation of a fluid mixture for other embodiments.

Figure 1:
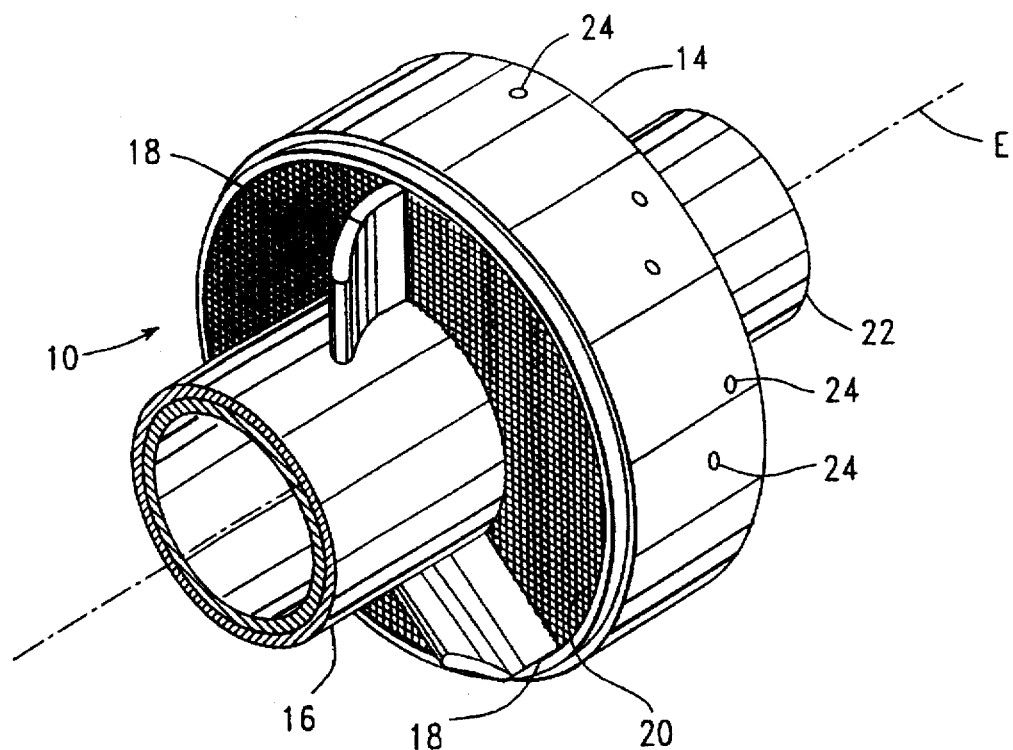
FIG. 1 is a perspective view of the deoiler with the three bladed cambered inducer and the variable housing for supporting the variable size porous material disks.
Figure 2:
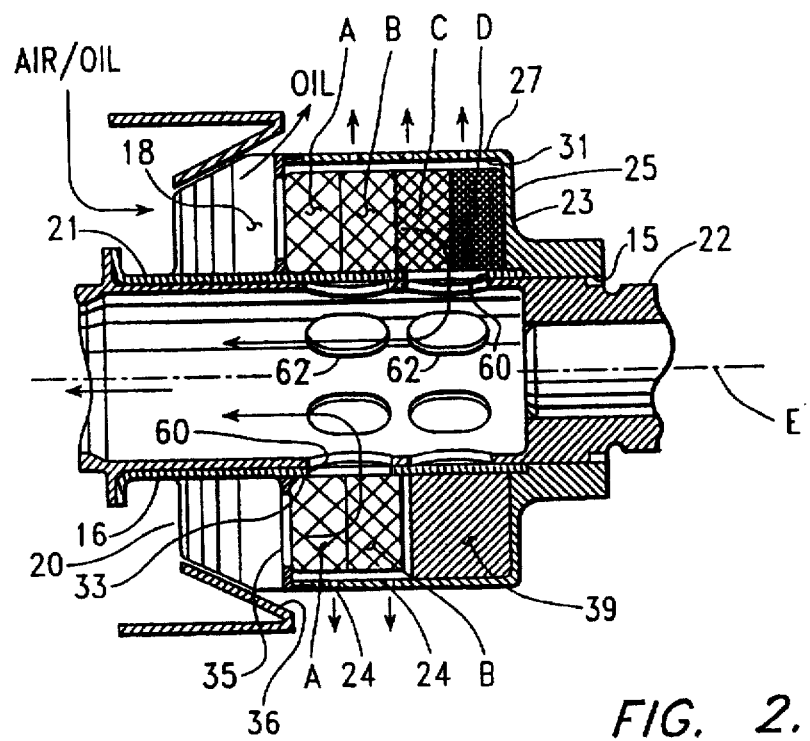
FIG. 2 is sectional view of the deoiler of FIG. 1 illustrating the details of the invention.
Figure 3:
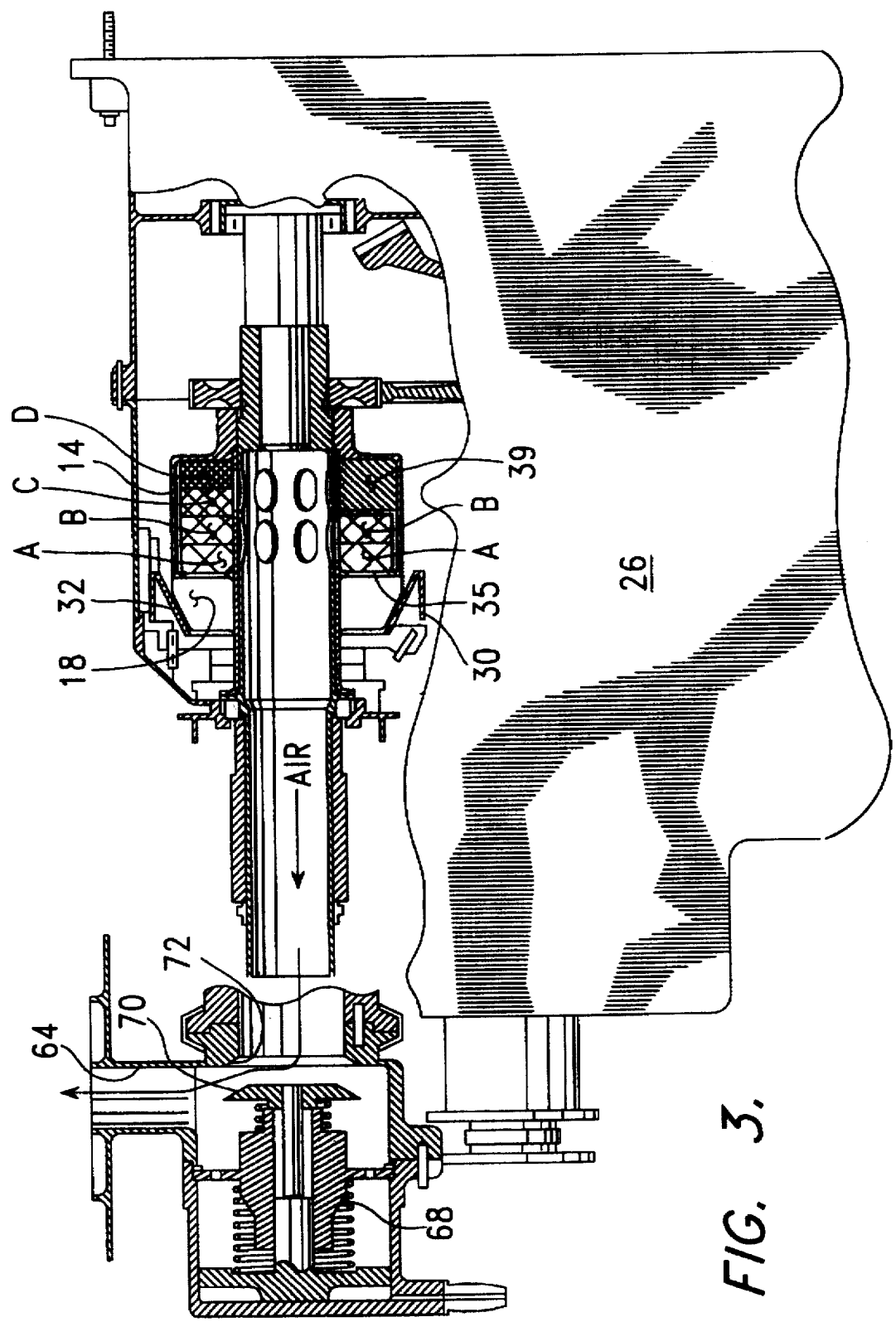
FIG. 3 is a cut away view partially showing the details of the gear box where this invention is being utilized.

Referring next to FIGS. 1–3 and as described in the U.S. Pat. No. 5,114,446, supra, the engine's gearbox is the ideal place in the turbine power plant to locate the deoiler because 1) the pressure in the gear box is lower than the pressure in the bearing compartment (not shown) and 2) the gearbox drives several shafts, one of which may be utilized for accommodating the deoiler. Obviously, the invention may be located in other locations in the engine just as other rotary machinery applications may find it desirable to utilize this invention.

As noted in FIG. 1 which illustrates, in perspective, the deoiler generally indicated by reference numeral 10 having an outer housing 14 supported to shaft 22. As can be seen by looking into the forward end of the housing 14, the bladed rotor 16 mounted on shaft 22 ahead of housing 14 includes three equally circumferentially spaced inducer blades 18 which are cambered to accelerate the air/oil mixture as it flows into the inducer blade inlet 20 so as to cause the air/oil mixture to separate into its two components of air and oil. The RPM of the bladed rotor 16 driven by shaft 22 which rotates about axis E is relatively high for effective oil separation as will be described in more detail hereinbelow. The shaft 22 is ultimately driven by the engine's main shaft (not shown) via the gear box 26 (FIG. 3).

A plurality of discretely located circumferentially spaced oil discharge holes 24 are formed in housing 14 and discharge the oil that is separated out of the air/oil mixture by the inducer blades 16 and the porous media. The next portion of the description will describe the process of separating and removing the oil from the air/oil mixture for returning it to the lubrication system and gear boxes and discharging the residue air.

As can be seen in FIGS. 2 and 3, the air/oil mixture is radially admitted into the gear box 28 where it passes through the deoiler shroud 30 and flows tangentially toward the inlet 20 and then induced axially into the inlet by virtue of the rotating inducer blades 18. The vortex stream of the air/oil mixture impinges on the relatively high speed inducer blades where it is further rotated and centrifuged causing the air/oil mixture to separate. The heavier droplets of oil (compared to the air) are centrifuged toward the outer periphery of the sloping wall 32 of shroud 30 which is generally W-shaped in cross section to migrate toward and ultimately be forced out of the deoiler through the annular spaced slots 36 and returned to the gear box 26. While in this particular application this action serves to remove the majority of the oil component, none-the-less, a small quantity of oil remains in the stream. This air/oil mixture, however, contains smaller oil droplets which are not sufficiently heavy to be removed by the centrifugal action of the inducer and need to be removed. According to this invention these minute droplets of oil are separated by and subsequently removed by the rotating porous media disks 40 as will be described in the next portion of this description.

As can best be seen in FIG. 2, housing 14 is annular in shape and includes a central bore 15 for accommodating the shaft 22 and the axial extension 21 of rotor 16. The housing 14 consists of the annular portion 23 defining the back wall 25, the outer annular wall 27 and the annular extension portion 21 for defining the cavity 31 for accommodating the porous media disks A, B, C, and D. The front wall 33 is affixed to the end of the annular wall 27 and defines the inlet 35. The porous media disks are toroidal shaped and are mounted on the sleeve portion of extension 21 of the rotor 16 which is, in turn, mounted on shaft 22 to be rotated thereby. The disks are made from a wire mesh or sintered material and are sized to have different porosities to accommodate the size of the oil droplets. These disks are commercially available from Dunlop Aviation Division of Dunlop Limited of Coventry, England and can be purchased with varying grades. The cavity 31 in this embodiment is shown to accommodate as many as four different grades of disks. Each disks has a different density with the higher density disk increasing relative to the flow of the air/oil mixture.

While this cavity can accommodate up to four disks depending on the thickness of each disk, it can be extended axially to accommodate even more. For emphasis purposes, the drawing shows two full annular disks A and B and only the top half of disks C and D. Obviously, whenever a disk is removed a suitable spacer 39 of suitable material is inserted in the vacant space.

As the flow proceeds from the inlet 35 and encounters the varying sized disks the oil droplets impact on the surface of the wire mesh of the porous media disks causing the minute particles to coalesce and then be pumped outward by the centrifugal action of the rotating disks toward the outer wall until they migrate to the specially sized and discretely located discharge holes 24. The oil free air exits through the air discharge holes 60 formed in extension 21 and discharge holes 62 formed in the hollow shaft 22. When four disks are utilized the discharge holes 62 are formed in the aft end and when lesser number of disks are utilized the discharge holes 62 align with the aft disks in the cavity 31. This is to assure that only the oil-free air is being discharged. The air flows toward the entrance end of the deoiler through shaft 22 where it is ultimately discharged through the overboard discharge port 64 by first passing through the pressure activated spring loaded breather valve 68. The breather valve is normally held closed at altitude of the aircraft by the spring by seating valve element 70 on seat 72 and only opens when the pressure in the hollow shaft overcomes the spring load on the valve element 70.

The porous disks elements A,B,C and D are sized and disposed in the increasing density relative to the flow not only to maximize the removal of the oil, but also to control pressure losses and reduce the overall pressure drop. Essentially and without limitation the deoiler provides the following advances over the heretofore known deoilers are a result of this invention:

1) The shroud provides tangential entry of the air/oil mixture and causes initial oil separation to the flow as it turns the mixture for axial entry into the deoiler with a consequential increase in oil separation efficiency and a reduction of pressure losses.

2) The inducer blades which are less in number than heretofore known designs provide the bulk of the oil separation from the air/oil mixture and are aerodynamically designed to reduce pressure loss effect.

3) The variable housing length accommodates a varying number of material disks to provide pressure drop capability and match different engine design configurations and conditions.

4) By utilizing varying density porous media the oil separation surfaces are increased so as to increase oil separation.

5) The oil discharge holes are specially sized by an empirical and trial by error method so as to meter the oil discharge for control of the pressure drop.

6) The deoiler is a multi-stage separation system that maximizes oil separation by providing a staged process and the arrangement of the various separating mechanisms enhances separating efficiency and minimizes pressure losses.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A deoiler system for removing the components of air and oil from an air/oil mixture including a rotatable inducer for removing a portion of the oil from said air/oil mixture in combination with a rotatable porous media means for removing the remaining portion of the oil from said air/oil mixture and means for imparting rotary motion to said rotatable inducer and said rotatable porous media means.

2. A deoiler system as claimed in claim 1 wherein said rotatable porous media means includes a toroidal shaped disk.

3. A deoiler system as claimed in claim 2 including a hollow shaft and a housing supporting said porous media disk, said rotatable inducer being mounted on said shaft and said porous media disk being mounted downstream on said shaft relative to the flow on said air/oil mixture.

4. A deoiler system as claimed in claim 3 wherein said porous media means includes a plurality of porous media disks and each of said disks having different densities and being sequentially disposed in a progressively increasing density arrangement with the highest density being located furthest downstream from said rotatable inducer and an opening in said hollow shaft for flowing said air from said separated air/oil mixture through said hollow shaft.

5. A deoiler system as claimed in claim 4 wherein said housing is sized to accommodate varying number of porous media disks.

6. A deoiler system as claimed in claim 5 wherein said porous media disks are made from a metallic mesh material.

7. A deoiler system as claimed in claim 6 wherein said inducer consists essentially of three equally spaced cambered inducer blades.

8. A deoiler system as claimed in claim 7 including an annular shroud having an inwardly angular depending member having an upwardly sloping surface for defining an inlet to said cambered inducer blades, a slot formed adjacent said housing and the end of said sloping surface remote from said inlet for discharging oil separated by said inducer.

9. A deoiler system as claimed in claim 6 including discharge oil holes in said housing adjacent the outer periphery of said porous media disks.

10. A deoiler apparatus for removing oil from an air oil mixture for the lubrication system of a gas turbine engine including a gear box having a rotatable hollow shaft, a breather valve in fluid communication with said hollow shaft, a deoiler housing defining an annular cavity concentrically mounted on said shaft and rotatable therewith, at least one porous media disk mounted on said shaft for rotation therewith being disposed in said cavity, an inducer having equally spaced cambered inducer blades mounted on said shaft for rotation therewith for imparting centrifugal motion to said air/oil mixture for removing a portion of oil therefrom, an opening is said housing in fluid communication with the air/oil mixture discharged from said inducer for admitting the air/oil mixture into said porous media disks for centrifuging the remaining oil from said air/oil mixture, and openings in said inducer and said housing for discharging said separated oil into said gear box and in said shaft for flowing the residue air to said breather valve.

11. A deoiler apparatus as claimed in claim 10 including other porous media disks having varying densities rotatably mounted on said shaft and being arranged sequentially relative to the density so that the higher density is further downstream from said inducer.

12. A deoiler apparatus as claimed in claim 11 wherein said porous media disk and said other porous media disks are toroidal shaped.

13. A deoiler apparatus as claimed in claim 12 wherein said porous media disk and said other porous media disks are made from metallic wire mesh.

14. A deoiler apparatus as claimed in claim 13 wherein said housing is sized to accommodate varying numbers of porous media disks.

15. A deoiler apparatus as claimed in claim 14 including an annular shroud having an inwardly angular depending member having an upwardly sloping surface for defining an inlet to said cambered inducer blades, one of said openings being a slot formed adjacent said housing and the end of said sloping surface remote from said inlet for discharging oil separated by said inducer.

16. A deoiler apparatus as claimed in claim 15 wherein said openings include discharge oil holes in said housing adjacent the outer periphery of said porous media disks.

* * * * *